United States Patent
Roehm et al.

[11] Patent Number: 5,809,105
[45] Date of Patent: Sep. 15, 1998

[54] NOISE FILTER FOR DIGITAL X-RAY IMAGING SYSTEM

[75] Inventors: Steven P. Roehm, New Berlin, Wis.; Ruchi Mangalik, Buffalo Grove, Ill.

[73] Assignee: General Electric Company, Waukesha, Wis.

[21] Appl. No.: 820,794

[22] Filed: Mar. 19, 1997

[51] Int. Cl.[6] .................................................. H05G 1/60
[52] U.S. Cl. ............................ 378/98.12; 378/98; 378/62
[58] Field of Search ........................... 378/62, 98, 98.12, 378/901

[56] References Cited

U.S. PATENT DOCUMENTS

| | | | |
|---|---|---|---|
| 5,293,574 | 3/1994 | Roehm et al. | 378/98.2 |
| 5,400,377 | 3/1995 | Hu et al. | 378/8 |
| 5,473,655 | 12/1995 | Hu | 378/4 |
| 5,561,695 | 10/1996 | Hu | 378/8 |

*Primary Examiner*—David P. Porta
*Assistant Examiner*—David Vernon Bruce
*Attorney, Agent, or Firm*—Quarles & Brady

[57] ABSTRACT

An x-ray fluorographic system produces frame images at a low dose rate for both on-line and off-line use. Background noise is filtered by first producing a mask which defines the boundaries of the structural features of interest. The mask is used to select the background pixels for filtering, while enabling the structural pixels to pass unfiltered to the display.

6 Claims, 2 Drawing Sheets

NOISE FILTER FOR DIGITAL X-RAY IMAGING SYSTEM

BACKGROUND OF THE INVENTION

The field of the invention is digital x-ray imaging systems and particularly, x-ray fluorographic systems used in clinical cardiology.

In x-ray fluorographic systems the x-rays are received by an image intensifier which converts them to a bright optical image that appears on an output phosphor of the intensifier tube. This image is viewed with a video camera which converts the image to analog video signals, and these are digitized into frames of picture elements (pixels).

These frames of digitized x-ray data are typically processed in a digital video processor to filter out undesired signals and enhance desired features. The resulting image data is then applied to a digital-to-analog converter which produces a video signal suitable for driving a CRT monitor.

The digitized frames of image data may be used in a number of ways by a cardiologist. As indicated above, the frames can be displayed immediately on the CRT monitor to provide the cardiologist with a cineangiogram or fluoroscopic view of the patient in real time. Such a mode of operation may be used, for example, when positioning a catheter in the patient's vascular system for treatment of a lesion. This mode requires that any processing performed by the digital video processor be carried out at a frame rate which does not cause the picture to flicker.

In the alternative, the acquired image frames may also be stored and played back by the cardiologist. For example, a series of image frames may be acquired for a complete cardiac cycle, digitized and stored. This series of image frames may be processed in a variety of ways to enhance specific features and then played back on the CRT monitor. The cardiologist may play the processed series of image frames back in real time to observe the vasculature during an entire cardiac cycle, he may step through each frame, or he may freeze the sequence on a particular image frame. These "off-line" modes of operation are employed primarily for location and diagnosis of lesions prior to any remedial procedure.

One of the problems with x-ray fluorographic systems is the high noise levels associated with the low x-ray doses that are used. This noise is particularly distracting when viewing the images in real time on a monitor. Currently used methods for reducing fluoro-noise employ inter-frame integration which works well if the subject does not change significantly from frame to frame. However, when imaging the rapidly moving heart, these integration methods produce blurring and other motion artifacts which are not acceptable to cardiologists.

SUMMARY OF THE INVENTION

The present invention is a filter for images produced with flouro level x-rays that may be applied separately to each image frame. More specifically, the filter includes means for producing a mask from the frame image data which distinguishes the structural pixels from the background pixels; means for applying the mask to the frame image data to select the background pixels therein; and a Poisson filter which is applied to filter the selected background pixels.

A general object of the invention is to improve the quality of fluorographic images. The noise reduction filter aggressively reduces noise in the selected background tissue pixels. The structures of interest to the cardiologist, such as blood vessels and catheter wires, are not filtered so that their edges remain sharp and the structures remain clear and well defined.

DESCRIPTION OF THE PREFERRED EMBODIMENT

Figure 1:
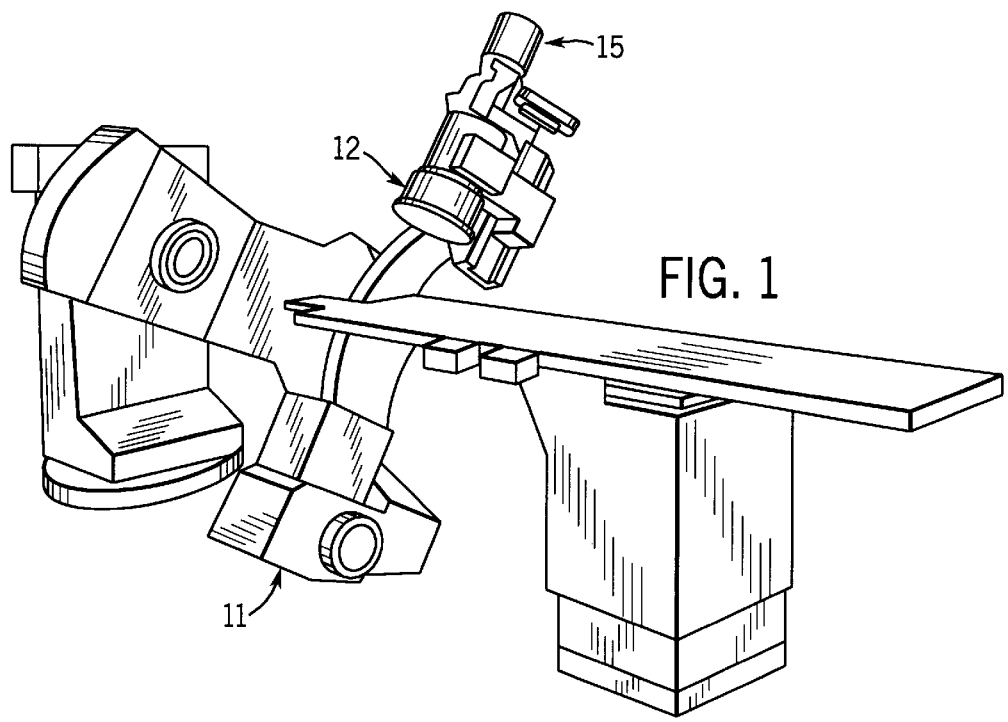
FIG. 1 is a pictorial view of a digital cardiovascular x-ray system which employs the present invention.
Figure 2:
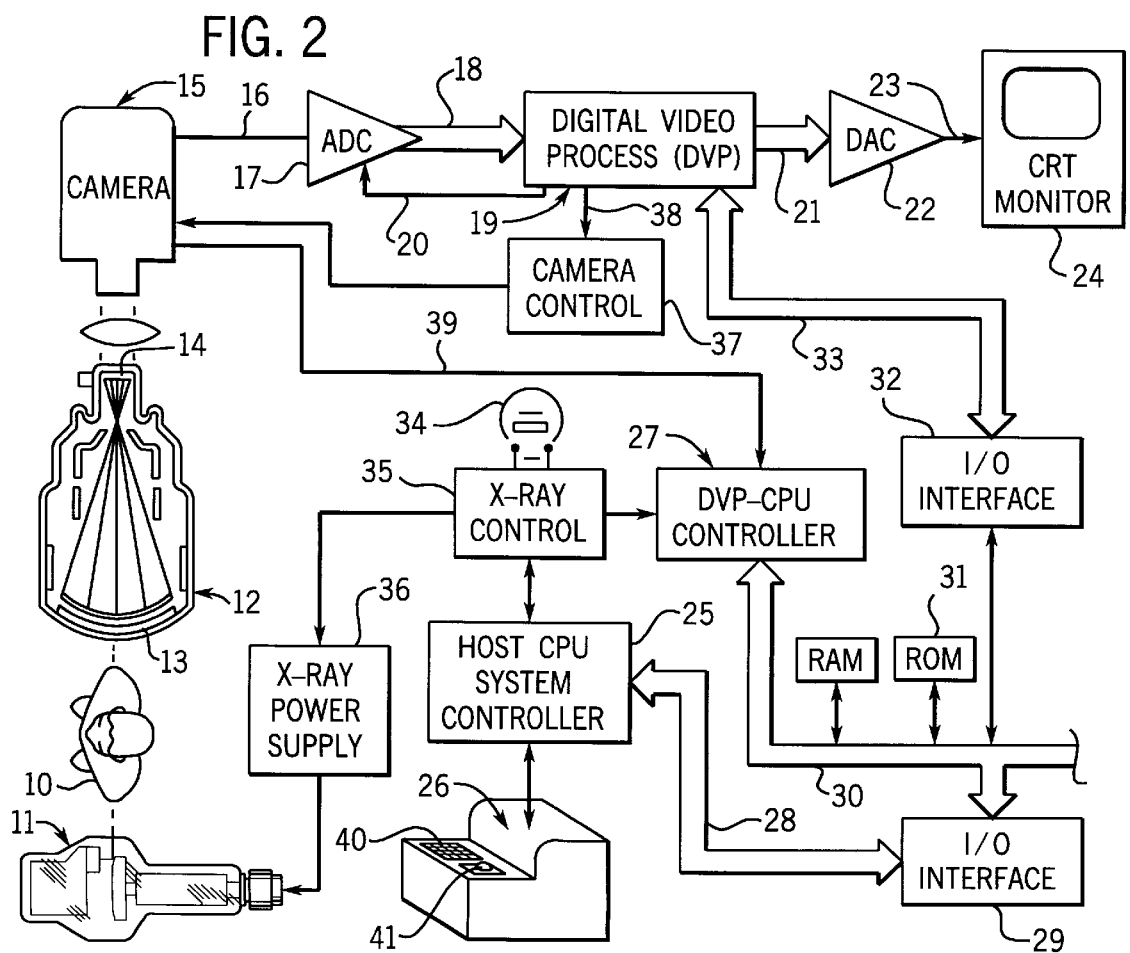
FIG. 2 is a schematic drawing of the digital cardiovascular x-ray system of FIG. 1.

The basic elements of a typical system for acquiring digital fluorographic images is depicted in FIGS. 1 and 2. The patient who is to undergo a fluorographic examination is shown at 10. An x-ray source 11 is located to one side of the patient and is controllable to project an x-ray beam through the patient for producing an x-ray image. An image intensifier 12 is positioned on the opposite side of the patient 10. The x-ray image emergent from the patient impinges on the input phosphor 13 of the intensifier 12 which is operative to convert the light on input phosphor 13 to a modulated electron beam image which impinges on an output phosphor 14 where conversion to a bright optical image occurs.

The optical image on output phosphor 14 is viewed with a video camera 15 that converts the image to corresponding analog video signals. The analog video signals are output from the camera 15 on line 16 and are input to an analog-to-digital converter (ADC) 17. ADC 17 is operative to convert the analog signal for each horizontal line to a series of digital signals whose values correspond to the intensities of the picture elements (pixels) comprising the x-ray image. The horizontal lines of digital pixel data are fed by way of bus 18 to a digital video processor (DVP) 19, where the lines forming a complete x-ray image frame are stored in a memory. In the most advanced fluorographic systems the digital pixel data representing each image frame are stored in raw form so the original data can be accessed at any time by the DVP 19 for further processing. DVP 19 provides a 12 MHz sample clock by way of line 20 to the ADC 17.

After the x-ray image data is processed in DVP 19, the digital image data signal is fed from the DVP 19 by way of bus 21 to the input of a digital-to-analog converter (DAC) 22 and converted to analog video signals. The analog video signals are supplied, by way of a line 23 to a CRT monitor 24 on whose screen the image is displayed. Each frame of x-ray image data is processed as it is produced by the camera 15 and may be displayed on the CRT screen 24 immediately to provide real-time display of the subject. In the alternative, a sequence of x-ray frames may be acquired and stored for later playback and analysis.

The present invention is carried out in part by the DVP 19. The DVP 19 includes several electronic components such as two full frame digital memories, an arithmetic logic unit (ALU), multiplexers, registers and multipliers which are interconnected by data buses, and input buses for raw or reprocessed images and an output line 21 for image signals leading to the CRT monitor on which a fluorographic image is viewed. A digital video processor central processor unit (DVP-CPU) 27 provides control data to the various components of the DVP 19 to activate or deactivate them for an image processing step or steps which, in effect, means that the data paths, data sources and data destination are addressed and controlled by instructions or signals provided by the DVP-CPU 27. Thus, the DVP 19 can be adapted within television frame rates to do such operations as adding and subtracting digital images, or shifting an image. The DVP 19 can also be controlled to multiply image pixel data by selected coefficients as required for various processing steps. A digital video processor such as that described in Andrews et al U.S. Pat. No. 4,449,195 is preferred, and the entire disclosure of that patent is incorporated herein by reference. The Andrews et al patent is assigned to the assignee of this application for patent.

The fluorographic system in FIG. 2 is controlled overall by a host central processor unit (CPU) system controller 25. An operator terminal 26 allows the examining cardiologist to call up any of a number of available fluorographic techniques allowing visualization of a particular part of the patient. The host CPU 25 sends generalized instructions to the DVP-CPU 27 identifying the image acquisition procedure for the elected type of examination. These instructions are provided over address/data bus 28, I/O interface 29 and bus 30. DVP-CPU 27 in turn accesses a recipe or list of instructions, for executing the examination technique, from read-only memory (ROM) 31 and through I/O interface 32 and bus 33 delivers the proper control words to the registers of the components in the DVP 19 so the components are activated and deactivated at the proper times and the data paths in the DVP 19 are properly routed to execute the image acquisition and processing instructions.

A sequence of x-ray exposures is initiated by actuating a hand switch 34. The x-ray control circuits 35 respond by turning the x-ray source 11 on and off at the proper times to start and stop individual exposures. A video camera control 37 receives timing signals from a DVP clock, by way of line 38 and a time base for the DVP-CPU controller 27 is produced by the vertical blanking pulse from video camera 15 as supplied over line 39.

In addition to providing a keyboard 40, the operator terminal 26 provides a trackball 41. The trackball 41 can be rotated in all directions to move a bright cursor on the CRT monitor 24. As described in U.S. Pat. Nos. 4,245,244 and 4,454,507, which are owned by the assignee of this application, such graphics, or cursor generators are well known in the art and they produce a series of pulses which correspond to the x,y coordinates of the cursor on the monitor's screen. The cursor coordinate information is applied to the host CPU 25, which in turn supplies it to the DVP 19.

Figure 3:
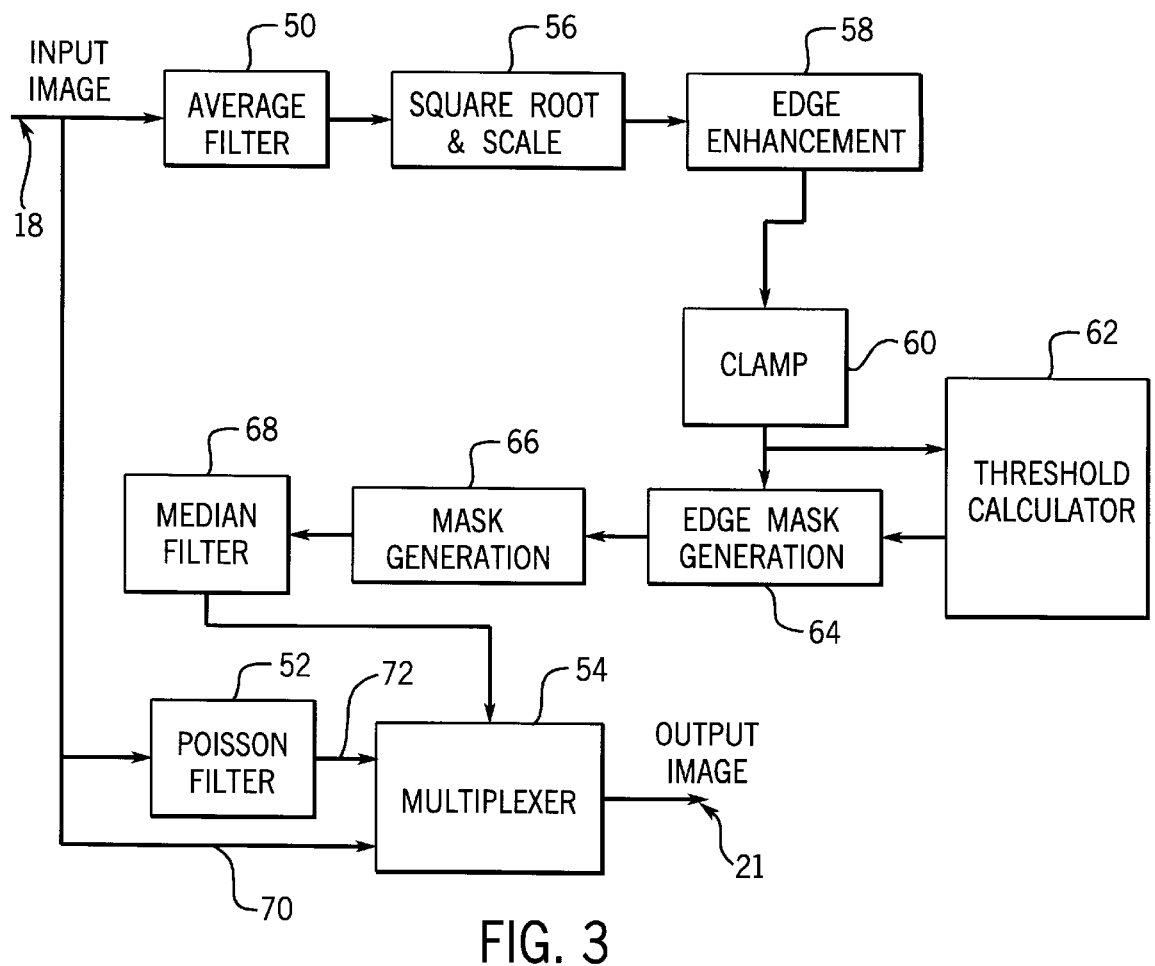
FIG. 3 is a block diagram of the filter system of the present invention which is part of the digital video processor in FIG. 2.

Referring particularly to FIG. 3, the functions carried out by the DVP 19 in response to the recipe executed by the DVP-CPU controller 27 to produce an image according to the present invention are shown in block diagram form. The series of digitized x-ray frames are received at input 18 and are processed as will now be described to produce a corresponding series of digitized x-ray frames at output 21. Each image frame at the input 18 is applied to an average filter 50, a Poisson filter 52, and a multiplexer 54. As will be described in detail below, the average filter 50 is the first step in the production of a mask image that identifies the structural elements in the input image frame, such as vessels and catheter guide wires. This mask image is used to control the multiplexer 54 such that those pixels in the input image frame that are within the structural elements are passed directly through to the output 21 without filtering, and those pixels that are within the background of the input image frame are passed through the Poisson filter 52 before being coupled to the output 21. The filter system of the present invention thus provides spatial filtering of surrounding tissues to reduce background noise, while retaining the edge information and the entire vessel or catheter wire image which is of interest to the cardiologist.

Referring particularly to FIG. 3, the mask image is produced by first smoothing the input image frame in the average filter 50. This is accomplished by using a 3×3 kernal that performs a "boxcar" average at each pixel. The smoothed values are then applied to a circuit 56 which calculates the square root of the image pixel values and then scales those values to a range from 0 to 255 (i.e. 8-bit values). The edges of structures in the image are then enhanced by a circuit 58. This is typically done by differentiation, but in the preferred embodiment the image is convolved with a 3×3 Sobel operator to approximate finding the gradient of the image. The resulting values are again scaled to a range from 0 to 255 by a clamp 60.

The mask is produced by detecting which pixels exceed a threshold value. First, a threshold value is calculated at circuit 62 and this value (T) is compared with each processed image pixel in an edge mask generation circuit 64. The threshold calculator 62 computes the standard deviation of the pixel values produced by the clamp 60. This is done by first computing the variance which is the sum of the squares of the image pixel values, minus the mean value of the pixel values, divided by the total number of pixels. The standard deviation is the square root of the variance and it is used as the threshold (T). The edge mask generator 64 compares each pixel value produced by the clamp 60 with the calculated threshold (T) and sets it to "255" if it exceeds the threshold (T). The remaining pixel values are set to "0".

The output of the edge mask generator 64 is an edge mask array which is applied to a mask generator 66 that connects the detected edges together. This is accomplished by scanning the edge mask array one row at a time to determine if two or more edges should be joined. This is done by determining if the "255" edge pixel is isolated, or if it is within an arbitrary pixel window of another edge pixel in the same row. If the system is in the fluoro mode, the catheter wire is the primary interest and only this row scan is performed. However, if the cine mode is chosen, the vasculature is also of interest, and since vessels are much wider than the catheter wire, a column by column scan is also performed. The column scan is the same as the row scan, except connectivity of the "255" mask values in the column direction is explored.

The last step in the production of the mask image is to filter it with a median filter 68. A 3×3 neighborhood kernel is used by the filter 68 which replaces each pixel with the median value of the 3×3 neighborhood. The median filter 68 does not blur the edges on features in the image mask. It also eliminates, without spreading, isolated "255" values that otherwise produce "salt and pepper" noise. This mask image is input to the multiplexer 54, and each pixel therein operates to select a corresponding pixel in the output image at 21.

If the mask image pixel is "255", the corresponding input image pixel is coupled directly from multiplexer input 70 to the output image 21. These "255" pixels represent the structures of interest to the cardiologists and they are passed through unchanged. On the other hand, the "0" mask image pixels control the multiplexer 54 to select a corresponding input image pixel at input 72. These "0" pixels are filtered at 52 before being coupled to the output 21. The "0" pixels represent background tissues and the Poisson filter 52 smooths additive image noise in these regions.

Figure 4:
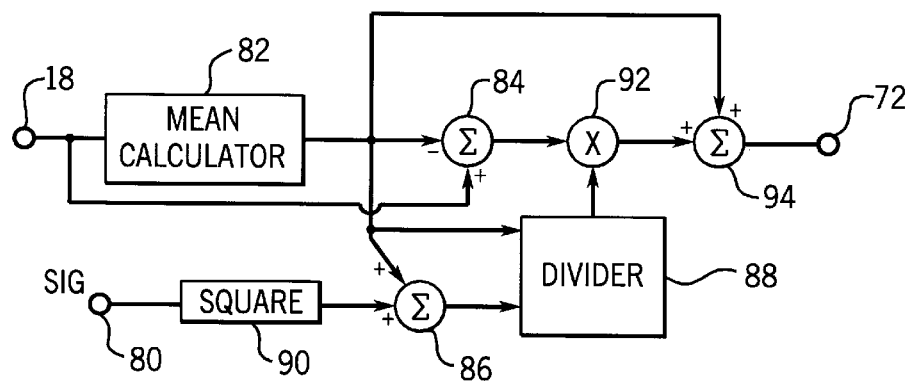
FIG. 4 is a block diagram of a Poisson filter which forms part of the filter system of FIG. 3.

The construction of the Poisson filter is shown in FIG. 4. In addition to the image data received at 18, the Poisson filter receives a "sigma" value at input 80. This value is selected and is typically set at, or around "8". The Poisson filter construction is simplified considerably by removing the mean value from the input image. This is accomplished by a mean calculator 82, which computes the means value of the input image. The mean value is then subtracted from the input image by a summer circuit 84. The mean value is also used in the Poisson filter process where it is input to a summing circuit 86 and a divider circuit 88. The summing circuit receives a signal at its other input equal to the square of input signal "SIG" which is produced by a squaring circuit 90. The output of the summing circuit 86 is also applied to the divider circuit 88 ($SIG^2$+mean) where it serves as the divisor. The output of divider 88 (var=mean/($SIG^2$+mean)) is applied to one input on a multiplier circuit 92 which also receives the input image from summing circuit 84. The output of multiplier 92 (var*(Input-mean)) is applied to a summing circuit 94 which adds back the "mean" signal and produces the filtered output on line 72.

In the above-described modes of operation the display process 30 is configured by the operator to display each processed x-ray frame in real-time as it is acquired. This fluoroscopic mode of operation is used most often to assist the cardiologist as he is carrying out a procedure such as coronary angioplasty. However, the display process 230 can also be configured to store the sequence of processed x-ray frames so that they can be played back at a later time for careful diagnosis. For example, a series of x-ray frames may be acquired to show the patient's heart during an entire cardiac cycle. The sequence of frames is then read out of the output image array 201 by the display process 230 in real time, slow motion or step-by-step so that the cardiologist can carefully follow the changes that occur in a particular coronary artery.

We claim:

1. An x-ray fluorographic system for producing a series of frame images of a subject acquired at low x-ray dose levels, the combination comprising:

means for acquiring a frame image by passing x-rays through the subject, the frame image being comprised of an array of pixel values;

means for receiving the frame image and producing a mask therefrom which distinguishes the pixel values that correspond to structural features in the image frame from the pixel values that correspond to background; and means for receiving the frame image and being responsive to the mask for selectively filtering the pixel values in the frame image that correspond to background.

2. The combination as recited in claim 1 in which the means for selectively filtering includes a Poisson filter and the pixel values corresponding to background are passed through the Poisson filter.

3. The combination as recited in claim 1 in which the means for selectively filtering includes a filter for receiving the frame image and producing a filtered frame image that is applied to one input of a multiplexer, and a second input on the multiplexer connects to receive the frame image, wherein the mask controls the multiplexer select between its two inputs.

4. The combination as recited in claim 3 in which the filter means is a Poisson filter.

5. The combination as recited in claim 1 in which the means for producing a mask includes:

means for filtering the received frame image to produce a filtered frame image;

means for enhancing the edges of structural features depicted in the filtered frame image; and means for comparing each pixel value in the edge enhanced frame image with a threshold value and producing an edge mask by setting the pixel to either one of two preset values.

6. The combination as recited in claim 5 in which the means for producing a mask further includes means for examining the preset values in the edge mask and connecting the indicated edges to define the boundaries of the structural features.

* * * * *